Figures 1, 14, 15:
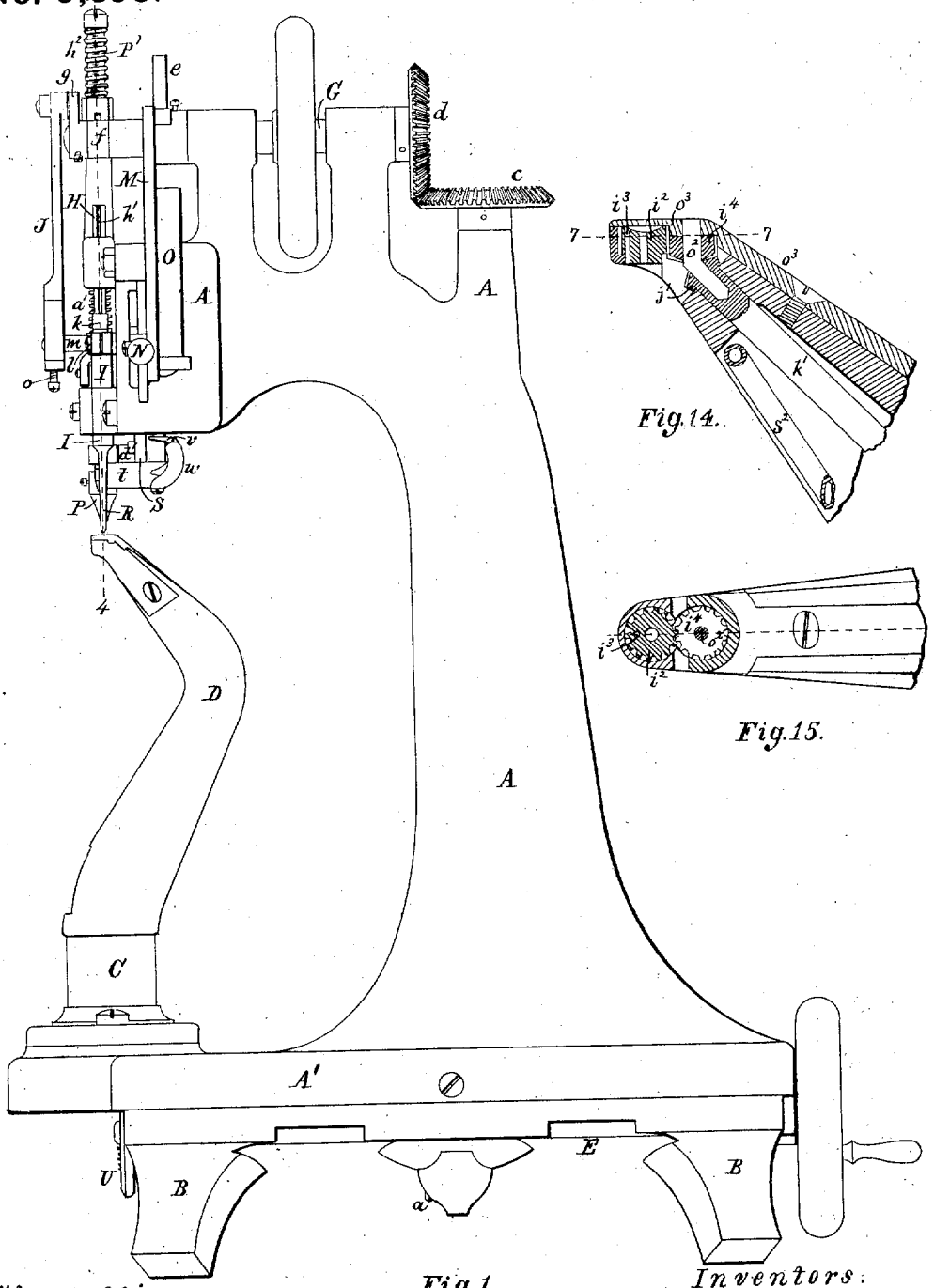

3 Sheets—Sheet 1.

S. SAWYER & W. ESTY,

Assignors by mesne assignments, to THE AMERICAN STAPLE SEWING MACHINE CO.

Machine for Sewing Shoes.

No. 9,698. Reissued May 10, 1881.

Witnesses:
C. A. Hemmenway
Benj. Andrews Jr.

Inventors:
Sylvanus Sawyer
William Esty
by N. C. Lombard

S. SAWYER & W. ESTY,
Assignors by mesne assignments, to THE AMERICAN STAPLE SEWING MACHINE CO.
Machine for Sewing Shoes.
No. 9,698. Reissued May 10, 1881.
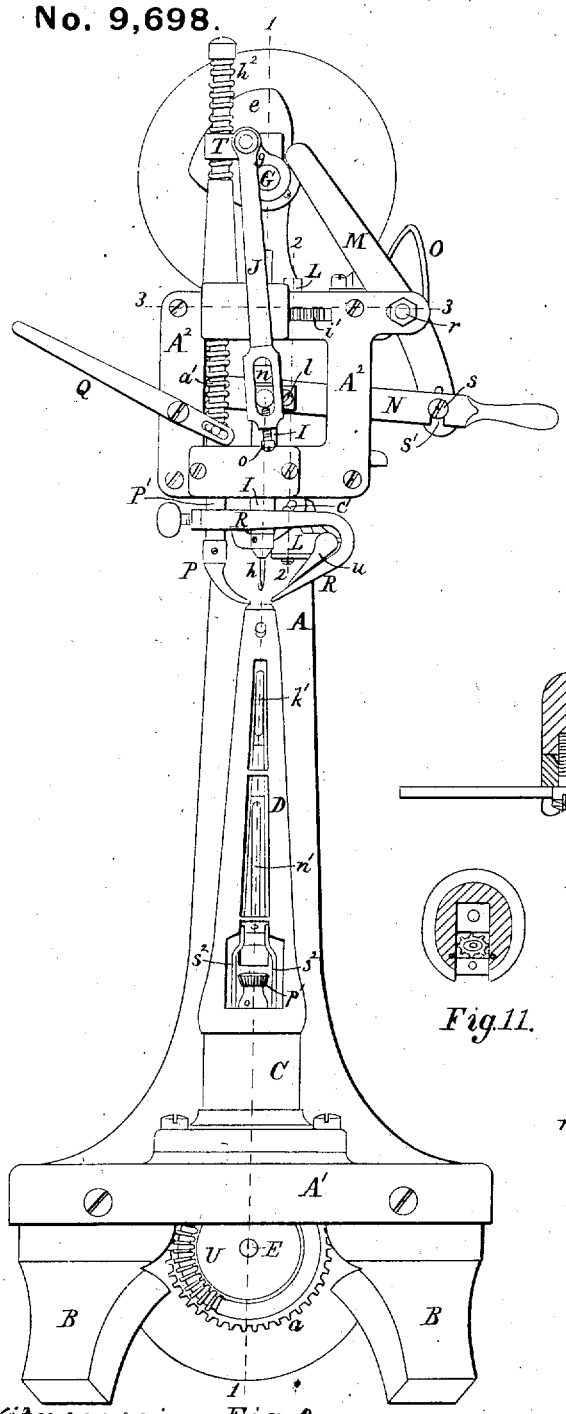
Fig. 2.
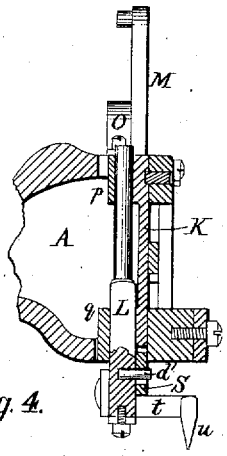
Fig. 4.
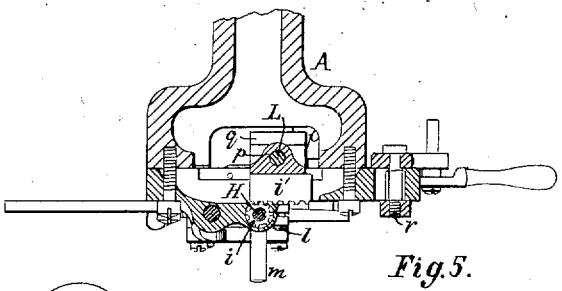
Fig. 5.
Fig. 11.
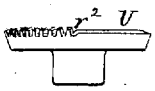
Fig. 8.
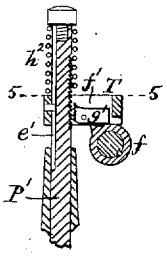
Fig. 6.
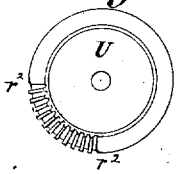
Fig. 9.
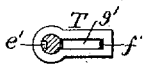
Fig. 7.
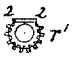
Fig. 10.
Witnesses:
E. A. Hemmenway
Benj. Andrews Jr.
Inventors:
Sylvanus Sawyer
William Esty
by N. C. Lombard
Attorney.

3 Sheets—Sheet 3.

S. SAWYER & W. ESTY.

Assignors by mesne assignments, to THE AMERICAN STAPLE SEWING MACHINE CO.

Machine for Sewing Shoes.

No. 9,698. Reissued May 10, 1881.

Witnesses:
E. A. Hemmenway
Benj. Andrews Jr.

Inventors:
Sylvanus Sawyer
William Esty
by N. C. Lombard
Attorney.

UNITED STATES PATENT OFFICE.

SYLVANUS SAWYER, OF FITCHBURG, MASS., AND WILLIAM ESTY, OF MANCHESTER, N. H., ASSIGNORS, BY MESNE ASSIGNMENTS, TO THE AMERICAN STAPLE SEWING MACHINE COMPANY, OF PUTNAM, CONN.

MACHINE FOR SEWING SHOES.

SPECIFICATION forming part of Reissued Letters Patent No. 9,698, dated May 10, 1881.

Original No. 174,159, dated February 29, 1876. Application for reissue filed September 16, 1880.

*To all whom it may concern:*

Be it known that we, SYLVANUS SAWYER, of Fitchbur , in the county of Worcester and State of Massachusetts, and WILLIAM ESTY, formerly of said Fitchburg, but now of Manchester, in the county of Hillsborough and State of New Hampshire, have jointly invented certain new and useful Improvements in Machines for Sewing Shoes, of which the following, taken in connection with the accompanying drawings, is a specification.

Our invention is designed more especially for sewing together the soles and uppers of boots or shoes, and relates to that class of sewing-machines in which a projecting horn is used, which is adapted to enter the interior of a boot or shoe, and carries a looping device which, working in conjunction with a barbed needle, which enters the material from the upper side, forms the "chain-stitch," so called.

Our invention is an improvement upon the machines patented to George V. Sheffield March 5, 1872, and January 21, 1873, and numbered, respectively, 124,293 and 135,047, and makes the "staple-stitch" described in said Patent No. 124,293, as well as the ordinary chain-stitch.

Our invention consists, first, in the use of a barbed needle, arranged to be reciprocated in the direction of its length, and to have an intermittent semi-rotation imparted thereto, in combination with a whirl or looper having an intermittent entire rotation imparted thereto, in such a manner that the motion of the whirl about its axis shall take place between the motions of the needle about its axis, and the oscillating or rotary motion of the needle shall take place while the whirl is in a state of rest.

Our invention further consists in so operating the whirl in the tip of the "horn" that it will make an entire revolution around its axis at each reciprocation of the needle, with a period of rest after each revolution, which revolution is always in the same direction, instead of an oscillating motion forward and back, as in the McKay & Mathies machine.

Our invention further consists in the employment of an intermediate gear-wheel provided with spur and bevel teeth between the whirl on one side and the bevel-gear on the upper end of the inclined shaft within the horn, by which means we are enabled to make the "tip" of the horn thinner than heretofore, and, as a result thereof, can work farther into the toe of a boot or shoe.

Our invention further consists in the use, in combination with a whirl or looper arranged to be rotated in the tip of a horn, of a peculiar arrangement of intermittent gearing, whereby the whirl is held positively in a fixed position during a certain part of the time employed in completing each and every stitch, and every movement thereof about its axis shall be in the same direction.

Our invention further consists in the use of a steam pipe or pipes suitably mounted within the cavity or hollow of the horn, and arranged to revolve with it, said pipe or pipes being bent into the form of an inverted U, and suitably connected at one end with a steam-generator, and at the other with a suitable place for discharging the waste steam and water of condensation, the live steam from the generator passing up one side of the horn and down the other, the thread lying between them.

Our invention further consists in the combination, with a steam pipe or pipes mounted within the cavity of the horn and arranged to be revolved therewith, of two annular chambers formed in the inner wall of the bearing in which the horn revolves, and suitable passages or pipes leading from one of said chambers to a steam-generator, and from the other to a suitable place for discharging the waste steam and water of condensation.

Our invention further consists in giving to the needle an intermittent reciprocating motion by means of a pitman operated by a crank-pin having a considerably greater throw than the needle, the lower end of said pitman being provided with a longitudinal slot, in which works a pin set in the needle-carrier, the lower end of the slot in the pitman being provided with a set-screw to vary the length of the slot, and thereby the length of the standstill of the needle.

Our invention further consists in so attaching the wrist-pin, with which the pitman engages to impart the reciprocating motion to the needle-bar, to the prismatic sleeve that it may be adjusted lengthwise of said sleeve for the purpose of adjusting the position of the lower end of the needle-bar relative to the work.

Our invention further consists in the arrangement of a presser-foot upon the side of the needle opposite to the feed-point and adapted to bear upon the last stitch made, in combination with a feed-guard mounted upon the same bar with said presser-foot, and movable therewith, and adapted to serve as a guard to the feed-point.

Our invention further consists in a peculiar device for lifting the presser-foot from the work while it is being fed, whereby the presser-foot is always lifted the same distance above the surface of the stock, whatever may be the thickness of the stock. For this purpose the presser-foot bar, which has its lower end square or of suitable shape in its lower bearing to prevent rotation thereof, is extended upward some distance above the cam-shaft. This upper end is made round and provided with a spline-groove to receive a feather set in the socket of an arm fitted to embrace said rod, so as to slide freely thereon. This arm is slotted and contains an elbow-lever, the perpendicular arm or toe of which is provided with a series of fine teeth on the side contiguous to the side of the presser-foot bar, which is also provided with a series of similar teeth. The arm rests upon the hub of a cam on the cam-shaft, against which it is pressed by a spring surrounding the upper end of the presser-bar and pressing upon said arm. A cam acts upon the horizontal arm of the elbow-lever, and, raising it, causes its teeth to engage with the teeth on the presser-bar, and then raise the bar and presser-foot.

Our invention further consists in mounting the feed-point bar in a vertical position in suitable bearings in a plate arranged to be reciprocated in a horizontal direction by means of a cam and lever, or their equivalents, in combination with a cam-slot connected to or formed in the presser-foot bar, all so arranged that the feed-point will be moved down an incline till it enters the stock and then move in a horizontal line to feed the stock by imparting a horizontal motion to said plate, the feed-bar being provided with a projecting pin fitted to and working in said slot.

Our invention further consists in so arranging the needle-bar and feed and combining them with a reciprocating plate or bar that said plate or bar shall operate the feed-point and impart an intermittent semi-rotary motion about its axis to said needle-bar.

Our invention further consists in so arranging and operating a barbed needle, a whirl, or other suitable loop-forming device and feeding device in a sewing-machine that the needle shall enter the stock with its barb toward the feed-point, make a half-revolution about its axis, where it remains stationary till the whirl, the thread-hole in which is on the right of the needle, or on the same side as the feed-point, has made a complete revolution about its axis, carrying the thread around the needle above the barb when the needle is moved upward, the barb engaging with the loop formed in the thread and drawing it up through the material. The needle is then turned back a half-revolution, so that the barb is again on the side toward the feed-point and still engaged with the loop when the feed-point is moved toward the needle, moving the stock with it a distance equal to the desired length of stitch. The needle now descends as before, still holding the loop just made, turns as before, and, rising the second time, draws up the second loop through the first without danger of catching the thread of the previous loop, and so on, making a perfect chain-stitch without employing a "cast-off."

Our invention further consists in so arranging and operating a barbed needle, a whirl, or other suitable loop-forming device, and a feeding device in a sewing-machine that the needle shall enter the stock with the barb on the side farthest from the feed-point, make a half-revolution about its axis, where it remains stationary till the whirl or looper has carried the thread around the needle above the barb, from a point upon the side of the needle farthest from the feed-point to the same point again, when the needle is moved upward, the barb engaging with the loop formed in the thread and drawing it up through the material. The needle is then turned back a half-revolution, so that the barb is on the side farthest from the feed-point. The feed-point is now moved forward, carrying the stock with it, and as the barb of the needle is turned away from the bite of the loop the loop is pulled off from the needle, and the needle, in its next descent, enters the stock outside of the loop, between it and the feed-point, the portion of the loop projecting above the stock being forced under the presser-foot, by which it is held from being drawn out by the needle in drawing up the next loop, thus forming a series of loops, drawing them through the material and releasing them, and thereby forming a seam composed of staple-stitches, substantially like those described in the Patents Nos. 124,293 and 135,047, granted to George V. Sheffield March 5, 1872, and January 21, 1873.

Figures 3, 12, 13:
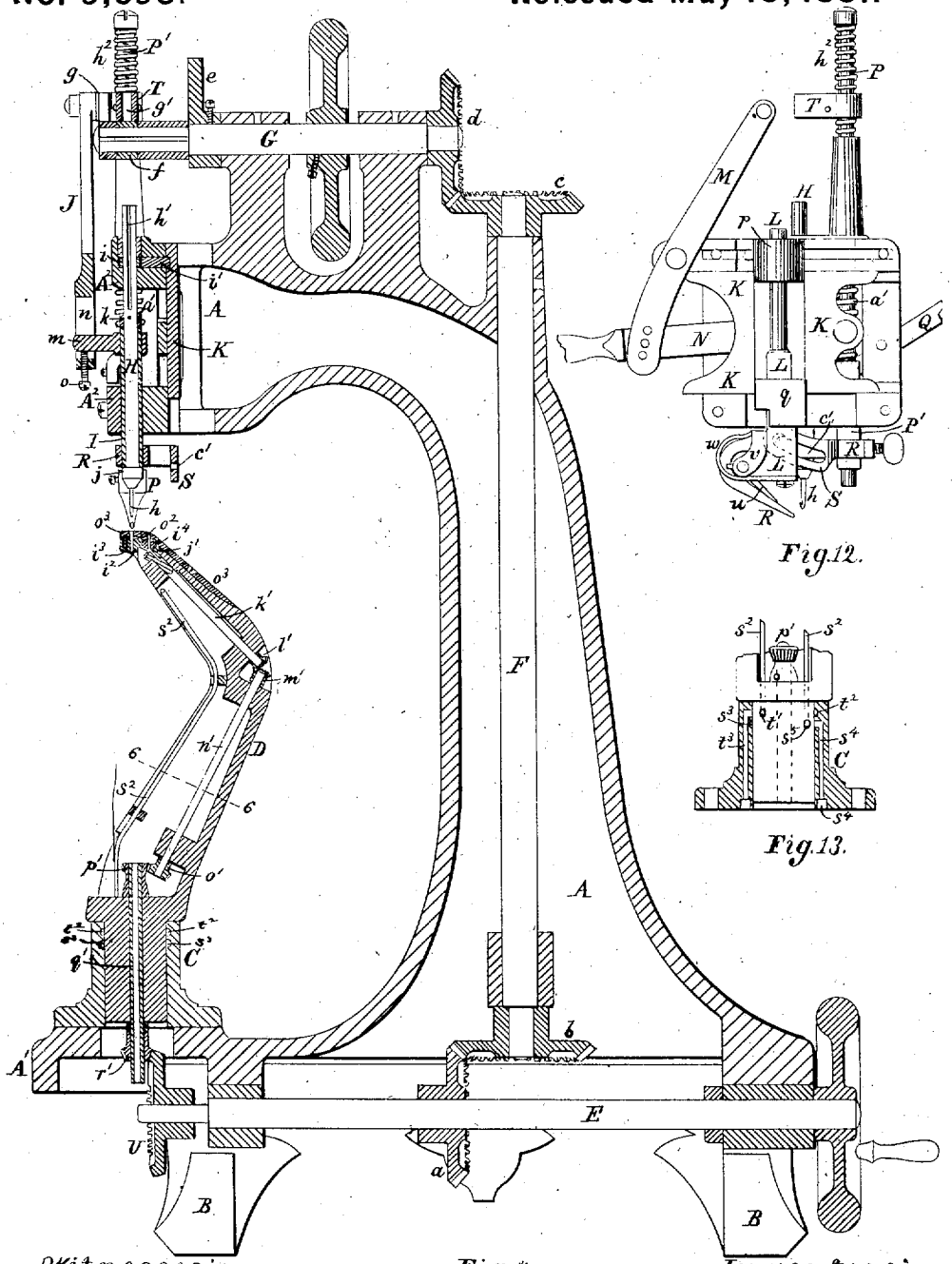

In the drawings, Figure 1 is a side elevation of a machine embodying our invention. Fig. 2 is a front elevation. Fig. 3 is a vertical section taken on line 1 1 on Fig. 2. Fig. 4 is a partial section of the head on line 2 2 on Fig. 2. Fig. 5 is a horizontal section on line 3 3 on Fig. 2. Fig. 6 is a partial section on line 4 4 on Fig. 1. Fig. 7 is a horizontal section on line 5 5 on Fig. 6. Figs. 8 and 9 are respectively an edge view and plan of a bevel-wheel, having teeth only upon a portion of its circumference, for operating the whirl. Fig. 10 is an end elevation of the pinion for imparting an intermittent motion to the whirl. Fig. 11 is a transverse section through the horn on line 6 6 on Fig. 3. Fig. 12 is an elevation of the back side of front plate of head and the mechanism mounted thereon, with the needle in its proper relative position to the feed-point for making the chain-stitch. Fig. 13 is a vertical section of the bearing in which the horn is supported, showing the base of the horn in elevation, and illustrating one mode of connecting the steam-pipes in the horn with a proper supply and discharge. Fig. 14 is a vertical section of the tip of the horn, and Fig. 15 is a horizontal section on line 7 7 of Fig. 14.

A is the frame, mounted upon legs B B to raise the base A′ above the floor.

C is a pipe-bearing secured to the upper side of the projecting portion of the base A′, as shown, and serves to support the horn D, which is so fitted thereto as to be susceptible of being rotated therein. The horn D is made hollow to receive the necessary mechanism for operating the whirl, and has its lower portion inclined from a perpendicular at an angle of about thirty degrees, and its upper portion inclined in the opposite direction at an angle of about forty-five degrees. The angles may be varied somewhat from the above by circumstances, such as a variable height of the horn, &c. This arrangement of making the horn in the form of an elbow with both portions inclined to a perpendicular, but in opposite directions, is a great advantage in the facility with which the work may be manipulated, especially when it is desired to sew around the heel, which involves turning the boot or shoe on the horn.

E is the driving-shaft, to which power may be applied in any well-known manner, and having firmly secured thereto the bevel-gear wheel *a*, which meshes into and drives a similar gear-wheel, *b*, on the lower end of the vertical shaft F, located within the hollow of the frame A, in suitable bearings for the purpose, and carrying at its upper end the bevel-gear wheel *c*, which meshes into and drives a similar gear, *d*, on the rear end of the horizontal shaft G, mounted in suitable bearings in the top of the frame A, and carrying on its front end the cams *e* and *f* and the crank *g*.

H is the needle-bar, fitted to receive a barbed needle, *h*, which is secured in any well-known manner. The needle-bar H is provided with a spline-groove, *h′*, in the upper portion of its length, to receive a feather set in the pinion *i*, through which the said needle-bar H is free to move endwise, said pinion being prevented from partaking of the reciprocating motion of the needle-bar by being placed between two portions of the cap-plate $A^2$ of the frame A. The needle-bar H is made cylindrical in form, and has a bearing in the sleeve I, the exterior of which is made square, or of any other suitable form, in cross-section, to prevent rotation thereof in its bearings in the cap-plate $A^2$. This sleeve is confined between two shoulders or collars, *j k*, formed upon or secured to the needle-bar H in such a manner that the sleeve and needle-bar will reciprocate together, while the needle-bar is free to be revolved within the sleeve. A small portion of the upper end of the sleeve I is made round, and has clamped thereto by the screw *l* the wrist-pin *m*, so as to be adjustable thereon, for the purpose of varying the position, vertically, of the needle relative to the work. The wrist-pin *m* fits into the slot *n* formed in the lower end of the pitman J, the upper end of which is fitted to the crank-pin *g*, which has considerably more throw than it is desired to give to the needle. The lower end of the pitman J is provided with a regulating-screw, *o*, for varying the time of contact of the pitman with the wrist-pin *m* in its upstroke, a similar adjustment of the time of the pitman, coming in contact with the wrist-pin in its downward stroke, being obtained by adjusting the wrist-pin *m* at a higher or lower point on the sleeve I. This arrangement of the pitman of the crank makes a very cheap and effective mode of obtaining an intermittent reciprocation of the needle-bar, and adjustment of the length of the standstill of the needle.

K is a plate, fitted to suitable bearings in the head of the frame A, and partially covered and held in place by the cap-plate $A^2$. Said plate K is provided with projections *p q* on its back side, in which is mounted, in a vertical position, the feed-bar L, and also has secured to its front side the toothed rack *i′*, arranged to engage with and act upon the pinion *i* to rotate the needle-bar H. The plate K has an intermittent reciprocating motion imparted thereto by the cam *e*, acting upon the upper end of the lever M, pivoted to the frame or cap-plate $A^2$ at *r*, the lower end of which is connected at *s* to the link N, the opposite end of which is pivoted to the plate K. The link N is connected to pin *s* by means of an open slot or notch, *s′*, so as to be readily disconnected so as to move the plate K by hand. The length of stroke of the plate K, and, as a consequence, the length of the feed, may be varied at will by adjusting the pin *s* in the lever M. The upper end of the lever M is kept in contact with the cam *e* by the tension of the spring O.

The feed-bar L has an offset at its lower end, upon the extreme end of which is formed a boss, *t*, projecting at right angles to the offset, in which is formed a bearing to receive a short rocker-shaft, upon one end of which is formed or secured the feed-point *u*, and upon the other end the arm *v*, the upper end of which is arranged to rest against the side of the feed-bar L, in which position it is retained by the spring *w*, the purpose of said spring being to hold the feed-point in position to engage with the stock when feeding, and to allow said point to rise and pass freely over the stock when it is being moved back preparatory to feeding another stitch.

P is the presser-foot, located upon the side of the needle opposite the feed-point, and secured in any well-known manner to the lower end of the presser-foot bar P′, mounted in suitable bearings in the cap-plate $A^2$ in such a manner that while it is free to be reciprocated therein it cannot be rotated. The presser-foot P is forced down upon the stock to be sewed by the spring $a'$, coiled about the rod P′, between its two bearings, in an obvious manner, and is raised from the stock by the lever Q, which may be operated by hand or connected to a treadle beneath the base and operated by the foot. The bar P′ has adjustably secured to its lower end the feed-guard R, which extends in a horizontal direction some distance beyond the needle-bar, (it being so constructed that the needle-bar passes through it,) and is then bent downward and inward toward the needle till its point is about the length of the longest stitch from the needle and about level with the upper surface of the stock, as seen in Figs. 2 and 12.

When the machine is making the staple-stitch the guard R is so adjusted as to not press with force upon the stock, its only office then being to serve as a guard for the feed-point; but when the chain-stitch is being sewed it serves the purpose of a presser-foot, as well as guard for the feed-point, the presser-foot P being then removed, and the guard R being so adjusted as to bear with sufficient force upon the stock to hold it firmly in place.

S is a plate formed in one piece with or firmly secured to the guard R, so as to move with it when it is adjusted or when the presser-foot is raised from the stock by the action of the lever Q, and is provided with the inclined curved slot $c'$, which controls the downward motion of the feed-point $u$ by acting upon a truck or roller mounted upon a pin, $d'$, set in the front side of the feed-bar L. The upper end of the presser-foot bar P′ is made round and provided with a spline-groove, $e'$, as seen in Fig. 7.

T is an arm fitted to the round upper portion of the bar P′ so as to be free to move up and down thereon, and projecting therefrom in a horizontal direction, with its under surface resting upon the hub of the cam $f$, as shown in Figs. 1, 2, and 3. The arm T has a slot, $f'$, (see Fig. 5,) cut vertically through it, extending outward from the eye which receives the bar P′, and has pivoted therein a small pawl-lever, $g'$, the short arm of which has formed upon its outer end a series of small teeth, arranged to engage with corresponding teeth formed upon the side of the bar P′ when the long arm of the lever $g'$ is raised by the cam $f$ acting upon its under surface, by which engagement the arm T becomes rigidly connected to the bar P′, and a continuation of the motion of the cam $f$ will cause the arm T, bar P′, and presser-foot P attached thereto to be raised together. When the point of the cam $f$ has passed from under the pawl $g'$ and arm T, the arm T, bar P′, and presser-foot P will descend again till the presser-foot rests upon the stock and the arm T rests upon the hub of the cam $f$. If thicker stock is fed under the presser-foot, so that it cannot descend to the point from which it started, the arm T will descend till it rests on the hub of the cam $f$, being forced along the rod P′ by the combined action of gravity and the tension of the spring $h^2$, thus automatically adjusting the presser-foot and its lift to the thickness of the stock being sewed.

The tip of the horn D has mounted in a suitable socket formed therein for the purpose the whirl $i^2$, provided with a central hole for the passage of the needle, and a hole, $i^3$, for the passage of the thread, said whirl having its upper surface cupped out around the central hole, as shown in Fig. 14, and provided with gear-teeth formed around its periphery parallel to its axis, which mesh into and are acted upon by similar teeth formed around the periphery of an intermediate gear, $i^4$, mounted upon the bent pin $o^2$, which has its bearings in the plate $o^3$ and the upper end of the inclined shaft $k'$, as shown in Figs. 3 and 14. The intermediate gear $i^4$ is also provided with a series of bevel-gear teeth, corresponding in number and size at their large ends with the spur-gear teeth, and arranged to engage with a bevel-gear, $j'$, formed upon or secured to the upper end of the inclined shaft $k'$, mounted in suitable bearings in the hollow of the upper portion of the horn.

To the lower end of the shaft $k'$ is secured a bevel-gear wheel, $l'$, which meshes into and is acted upon by the bevel-gear wheel $m'$, secured to the upper end of the shaft $n'$, inclined in the opposite direction to the shaft $k'$, and mounted in suitable bearings in the hollow of the lower section of the horn D.

Upon the lower end of the shaft $n'$ is secured the bevel-gear wheel $o'$, which meshes into and is acted upon by a similar gear-wheel, $p'$, secured to the upper end of the hollow shaft $q'$, mounted in a vertical position in the base of the horn D, with its axis concentric with the journal of said horn and in line with the axis of the needle-bar.

Upon the lower end of the hollow shaft $q'$ is secured the bevel-pinion $r'$, having teeth formed around about three-fourths of its circumference, and the remaining portion made smooth and tangent to the pitch-circle at a point equidistant from the teeth upon either side thereof, as shown in Fig. 10. The pinion $r'$ meshes into and is acted upon intermittently by the bevel-gear wheel U, of considerably larger size than the pinion $r'$, and having the same number of teeth formed upon one side thereof as there are spaces in the pinion $r'$. The remaining portion of the wheel U is turned to the same bevel as the teeth and to the same diameter as the pitch-circle, with the corners contiguous to the first space upon either side rounded, as seen at $r^2$ $r^2$, Figs. 8 and 9. The wheel U is secured to the front end of the driving-shaft E, and rotates about its axis, with its smooth surface in contact with the smooth straight or slightly concave side of the pinion $r'$ till the first tooth on the wheel U strikes against the projecting corner 2 of the pinion $r'$, when the pinion $r'$ will be revolved by the continued motion of the wheel U till it has turned a complete revolution, when its flat side again comes in contact with the smooth surface of the wheel U, and the pinion remains stationary till the corner 2 again engages with the forward tooth in the wh A steam-pipe, $s^2$, is placed in the hollow of the horn D, bent as shown. One end of said pipe communicates with the annular chamber $s^3$, formed in the interior surface of the bearing C, through passage $s^5$, formed in the base portion of the horn D, and the other end in like manner through passage $t'$, with the annular chamber $t^2$ in said bearing C. The vertical passage $s^4$, leading from the chamber $s^3$, communicates, by means of a pipe screwed into the under side of the bearing C, (not shown in the drawings,) with a suitable steam-generator, and the vertical passage $t^3$ in like manner leads from the chamber $t^2$ to, and communicates with, a suitable place for discharging the waste steam and the water of condensation.

Instead of the chambers and passages in the bearing C, flexible pipes may be connected directly to the two ends of the steam-pipe $s^2$, or to passages in the base of the horn D, above or below the bearing C, leading to said pipe, the other ends of said flexible pipes connecting with suitable fixed pipes leading to the steam-generator and to the place for discharging the waste steam and water.

If it is desirable to make the staple-stitch, the relative position of the presser-foot, feed-point, and needle are the same as shown in Fig. 2, with the thread-hole in the whirl to the left of the needle, or upon that side of the needle directly opposite the feed-point, and the operation is as described in the statement of invention.

To make the chain-stitch the presser-foot P is removed and the needle turned in the needle-bar so that its barb shall be toward the feed-point, as shown in Fig. 12, and the whirl is removed from its bearing, turned half round, and inserted in its bearing again with the thread-hole between the needle and the feed-point, and the operation is the same as described in the statement of invention.

Having thus at length described our invention, what we claim as new, and desire to secure by Letters Patent of the United States, is—

1. The combination, in a sewing-machine, of a needle-bar carrying a barbed or hook needle, mechanism for imparting to said needle-bar and needle a reciprocation in the direction of their lengths and an intermittent semi-rotation or oscillation about its axis, a whirl or looper in the form of a wheel mounted in a fixed bearing, and mechanism for imparting to said whirl a complete revolution about its axis and the axis of the needle after each descent of the needle and while the needle is in a state of rest, substantially in the manner and for the purposes described.

2. In combination with a work-supporting horn adapted to enter the interior of a boot or shoe, a barbed needle and its bar, and mechanism for imparting to said needle a reciprocating motion in the direction of its length and a semi-rotation about its axis, a whirl or looper mounted in the tip of said horn, with its axis vertical and in line with the center of the needle, and mechanism, substantially as set forth, for imparting thereto a single complete revolution about its axis after each descent of the needle, and a period of rest after each revolution, said revolutions being always in the same direction, as and for the purposes described.

3. In combination with a barbed needle, and mechanism for imparting thereto a reciprocating motion in the direction of its length and a semi-rotation about its axis, and a whirl mounted in the tip of a horn, with its axis vertical and in line with the center of the needle, an inclined shaft mounted in bearings within the hollow of the horn, mechanism for revolving said inclined shaft about its axis, a bevel-gear wheel mounted upon the upper end of said inclined shaft, and an intermediate gear-wheel provided with a series of spur-gear teeth to engage with the whirl, and a set of bevel-gear teeth to engage with the bevel-gear on the shaft, substantially as and for the purposes described.

4. In combination with a work-supporting horn, a whirl or looper arranged to be rotated in the tip of said horn, with its axis vertical and in line with the center of the needle, the pinion $r'$, and wheel U, and mechanism, substantially as set forth, for connecting the pinion $r'$ and the whirl $t^2$, constructed and arranged to work together, as and for the purposes described.

5. In combination with a work-supporting horn adapted to enter the interior of a boot or shoe, and carrying in its tip a whirl or looper, a steam-pipe placed within the cavity formed in the horn, and bent, as set forth, through which steam passes, entering at one end and being discharged at the other, substantially as and for the purposes described.

6. In combination with a work-supporting horn and a steam-pipe arranged within the cavity thereof, as set forth, the bearing C, provided with the annular chambers $s^3$ and $t^2$, and passages $s^4$ and $t^3$ leading therefrom, substantially as and for the purposes described.

7. The combination, in a sewing-machine, of the pitman J, provided with the slot $n$ and regulating-screw $o$, and the needle-bar provided with the wrist-pin $m$, adjustably connected thereto, substantially as and for the purposes described.

8. In a sewing-machine, the combination of the presser-foot P and presser-bar P′ upon one side of the needle, and the feed-guard R, arranged upon the opposite side of the needle and adjustably secured to said presser-bar, and adapted to be raised with said presser-bar and presser-foot, substantially as and for the purposes described.

9. The combination, in a sewing-machine, of a reciprocating needle, a feed-point, mechanism for moving said feed-point vertically and horizontally, a presser-foot placed upon the side of the needle opposite to the feed-point, and a feed-guard placed upon the same side of the needle with the feed-point, and adapted to serve the double purpose of a presser-foot and a guard for the feed-point, substantially as and for the purposes described.

10. The combination, in a sewing-machine, of the presser-foot bar P′, provided with teeth upon a portion of its length, the arm T, having pivoted therein the pawl-lever *g′*, provided with teeth, as shown, and the cam *f*, all constructed, arranged, and operating substantially as described.

11. The combination of the plate K, mechanism for imparting to said plate a reciprocating motion, feed-bar L, mounted in bearings on said plate K, feed-point *u*, and plate S, provided with the inclined curved slot *c′*, all adapted to operate substantially as and for the purposes described.

12. The combination of the needle-bar H, provided with a spline-groove, *h′*, the pinion *i*, provided with a feather or pin to fit said groove, the plate K, having secured thereto the rack *i′*, and having mounted in suitable bearings thereon the feed-bar L, mechanism for imparting to said plate K a reciprocating motion, and the plate S, provided with the curved inclined slot *c′*, all adapted to operate substantially as described.

13. The combination, in a sewing-machine, of an intermittingly-acting feed mechanism, a needle-bar, mechanism for imparting to said needle-bar a reciprocating motion and an oscillating motion about its axis to the extent of half a revolution at each extreme of its reciprocation, a needle set in said bar with its barb toward the feed-point when the needle-bar is up, and a whirl or looper set with the thread-eye between the needle and the feed-point when the needle is descending, and mechanism for revolving said whirl entirely around its axis and the axis of the needle after each descent of the needle, and then hold it in a state of rest till the needle is withdrawn from the stock, turned a half-revolution, and descends again, substantially as and for the purposes described.

14. The combination, in a sewing-machine, of an intermittingly-acting feed mechanism, a needle-bar, mechanism for imparting to said needle-bar a reciprocating motion and an oscillating motion about its axis to the extent of half a revolution at each extreme of its reciprocation, a needle set in said bar with its barb on the side opposite the feed-point when the needle-bar is up, and a whirl or looper set with the thread-eye on the side farthest from the feed-point when the needle-bar is descending, and mechanism for revolving said whirl entirely around its axis and the axis of the needle after each descent of the needle, and then hold it in a state of rest till the needle is withdrawn from the stock, turned a half-revolution, and descends again, substantially as and for the purposes described.

Executed at Manchester, New Hampshire, this 17th day of January, 1879.

SYLVANUS SAWYER.
WILLIAM ESTY.

Witnesses:
L. B. CLAUP,
H. E. WEBSTER.